April 19, 1955     W. M. ZOOK     2,706,503
BRUSHES FOR CLEANING BAND SAWS
Filed April 20, 1953
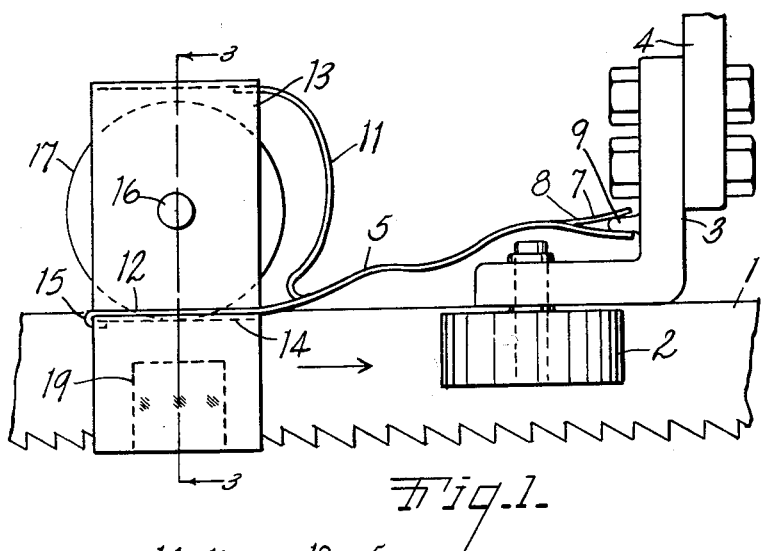
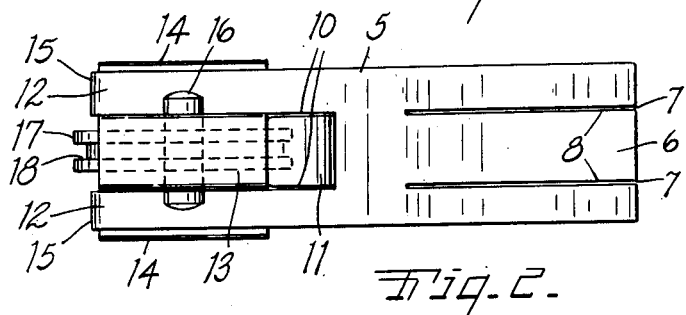
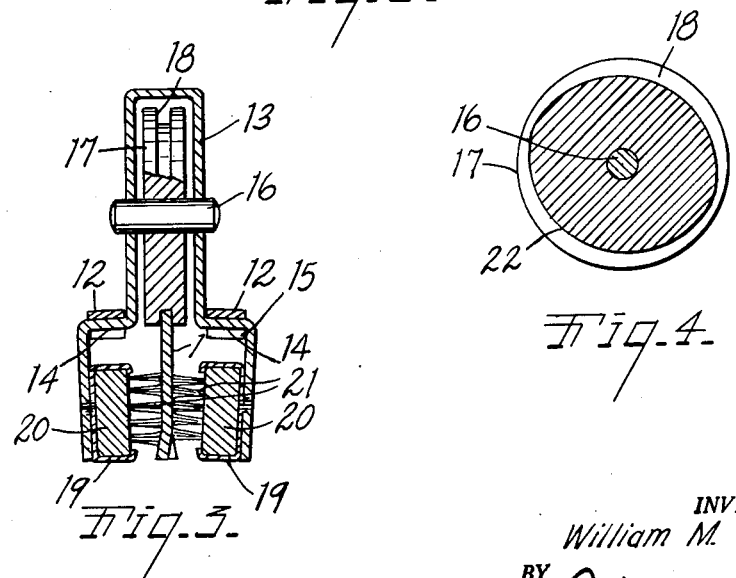
INVENTOR.
William M. Zook
BY
ATTORNEY

2,706,503

BRUSHES FOR CLEANING BAND SAWS

William M. Zook, Bangor, Mich., assignor to Kalamazoo Tank and Silo Company, Kalamazoo, Mich., a corporation of Michigan Application April 20, 1953, Serial No. 349,583

8 Claims. (Cl. 143—158)

This invention relates to improvements in brushes for cleaning band saws.

The principal objects of this invention are:

First, to provide an inexpensive brush assembly adapted to clean the teeth of metal cutting band saws.

Second, to provide a band saw brush that moves transversely over a band saw in a tooth cleaning action without requiring any independent driving connection to the brush.

Third, to provide a brush assembly for cleaning band saws which is easily mounted on or demounted from a band saw.

Fourth, to provide a band saw cleaning brush which derives its brushing motion directly from movement of the band saw being cleaned.

Other objects and advantages of the invention will be apparent from a consideration of the following description and claims. The drawings, of which there is one sheet, illustrate a highly practical form of the invention.

Fig. 1 is a fragmentary side elevational view of a metal cutting band saw and supporting structure with a brush assembly embodying the present invention associated therewith.

Fig. 2 is a plan view of the brush assembly shown in Fig. 1. Fig. 3 is a transverse cross sectional view through the brush assembly taken along the plane of line 3—3 in Fig. 1.

Fig. 4 is a cross sectional view through the supporting roller of the brush assembly.

Fig. 1 illustrates a portion of the working reach of a metal cutting band saw 1. The reach is laterally supported by guide rollers one of which is illustrated at 2 and the rollers are supported from the frame of the sawing machine by a angle member 3. The angle member 3 is in turn supported on the end of a suitable supporting arm 4 which is carried by the saw frame in any suitable manner. All metal cutting band saws have similar structure.

The brush assembly of the present invention consists of a bracket 5 of stamped or folded sheet metal construction. One end of the bracket forms an arm 6 that is slotted longitudinally as at 7 and the center portion of the arm is bent upwardly relative to the side portions to form a vertical notch or bifurcation 8. The bifurcated end of the arm receives and fits over a projection 9 formed on the side of the angle member 3.

The opposite end of the bracket 5 is also slotted longitudinally as at 10 and the center portion between the slits 10 is bent upwardly and outwardly in an arcuate portion 11. Disposed between the side fingers 12 is a downwardly opening U-shaped clip 13. The arcuate portion 11 fits within and underneath the top of the U-shaped clip 13. The lower ends of the branches of the U-shaped clip 13 are offset laterally outwardly as at 14 and the side fingers 12 are lapped over these offsets 14 and bent downwardly around the outer ends thereof as at 15. The clip 13 is thus attached to the bracket 5.

A shaft 16 projects between the branches of the U-shaped clip 13 above the lateral offset 14 and rotatably supports a wheel or roller 17. The wheel 17 is provided with a radially opening peripheral notch or groove 18. The groove 18 is adapted to receive the rear edge of the working reach of the band saw 1 so that the wheel supports the clip and bracket on the band saw. The lower ends of the branches of the clip 13 below the lateral offsets 14 are provided with inwardly facing retainers 19 adapted to receive the opposed brushes 20. The bristles 21 of the brushes project towards each other to wiping engagement with opposite sides of the band saw 1. In order to effect movement of the brushes 20 in a transverse motion across the teeth of the band saw, the base of the groove 18 is made eccentric to the shaft 16 as is best illustrated at 22 in Fig. 4. Thus as the wheel 17 rolls along the rear edge of the moving band saw 1 the clip 13 and brushes 20 move upwardly and downwardly to sweep chips and dirt from the teeth of the saw blade.

Having thus described my invention, what I claim to be new and desire to secure by Letters Patent is:

1. In combination with a sawing machine having a band saw blade with one reach directed to travel in upright edgewise position along a generally horizontal line and having a fixed arm supporting guide rollers along said reach, a projection on said arm, a bracket having a bifurcated end abutted against said arm and lapped over the top and bottom of said projection, a downwardly opening U-shaped clip secured to the other end of said bracket and positioned over said reach of said saw, laterally outwardly offset portions on the lower ends of the branches of said U-shaped clip, a roller supported between the branches of said clip by a shaft supported thereby, said roller having an eccentric groove in its periphery receiving and riding upon the back edge of said saw blade to oscillate said clip transversely of the blade, and brushes mounted in said off set portions with their bristles opposed in wiping engagement with opposite sides of said blade and extending downwardly below the teeth of the blade.

2. In combination with a sawing machine having a band saw blade with one reach directed to travel in upright edgewise position along a generally horizontal line and having a fixed arm supporting guide rollers along said reach, a bracket having an end abutted against said arm, a downwardly opening U-shaped clip secured to the other end of said bracket and positioned over said reach of said saw, laterally outwardly offset portions on the lower ends of the branches of said U-shaped clip, a roller supported between the branches of said clip by a shaft supported thereby, said roller having an eccentric groove in its periphery receiving and riding upon the back edge of said saw blade to oscillate said clip transversely of the blade, and brushes mounted in said off set portions with their bristles opposed in wiping engagement with opposite sides of said blade and extending downwardly below the teeth of the blade.

3. In combination with a sawing machine having a band saw blade with one reach directed to travel in upright edgewise position along a generally horizontal line and having a fixed portion supporting guide rollers along said reach, a bracket having an end abutted against said portion, the other end of said bracket being of downwardly opening U-shaped contour and positioned over said reach of said saw, laterally outwardly offset portions on the lower ends of the branches of said U-shaped end, a roller supported between the branches of said end by a shaft supported thereby, said roller having an eccentric groove in its periphery receiving and riding upon the back edge of said saw blade to oscillate said bracket transversely of the blade, and brushes mounted in said offset portions with their bristles opposed in wiping engagement with opposite sides of said blade and extending downwardly below the teeth of the blade.

4. In combination with a sawing machine having a band saw blade with one reach directed to travel in upright edgewise position along a generally horizontal line and having a fixed portion supporting guide rollers along said reach, a bracket having an end abutted against said portion, the other end of said bracket being of downwardly opening U-shaped contour and positioned over said reach of said saw, a roller supported between the branches of said end by a shaft supported thereby, said roller having an eccentric groove in its periphery receiving and riding upon the back edge of said saw blade to oscillate said bracket transversely of the blade, and brushes mounted on said branches with their bristles opposed in wiping engagement with opposite sides of said blade.

5. A cleaner for a band saw blade comprising, a U-shaped support clip having brushes secured thereto in opposed relationship to engage the opposite sides of a blade, a roller mounted on said clip between the arms thereof and above said brushes, said roller having a grooved eccentric portion positioned in the plane between said brushes to engage the rear edge of a saw blade, and a side portion on said clip including a projecting arm adapted to abuttingly engage a stop adjacent a saw blade and prevent said clip from moving longitudinally of the blade.

6. A cleaner for a band saw blade comprising, a support clip having brushes secured thereto in opposed relationship to engage the opposite sides of a blade, a roller mounted on said clip between the arms thereof and above said brushes, said roller having an eccentric portion positioned in the plane between said brushes to engage the rear edge of a saw blade, and a side portion on said clip adapted to abuttingly engage a stop adjacent a saw blade and prevent said clip from moving longitudinally of the blade.

7. A cleaner for a band saw blade comprising, a support clip having brushes secured thereto in opposed relationship to engage the opposite sides of a blade, a roller mounted on said clip and above said brushes, said roller having a grooved eccentric portion positioned in the plane between said brushes to engage the rear edge of a saw blade, and a side portion on said clip adapted to engage a stop adjacent a saw blade and prevent said clip from moving longitudinally of the blade.

8. A cleaner for a band saw blade comprising, a support clip having brushes secured thereto in opposed relationship to engage the opposite sides of a blade, and a roller mounted on said clip and above said brushes, said roller having an eccentric portion positioned in the plane between said brushes to engage the rear edge of a saw blade.

References Cited in the file of this patent

UNITED STATES PATENTS

| | | |
|---|---|---|
| 317,603 | Wilson et al. | May 12, 1885 |
| 337,647 | Allington | Mar. 9, 1886 |
| 2,307,046 | Johnson et al. | Jan. 5, 1943 |